United States Patent [19]

Kruka et al.

[11] 4,383,783

[45] May 17, 1983

[54] PIPELINE GEL PLUG

[75] Inventors: Vitold R. Kruka, Houston; Joe O. Esparza, Katy, both of Tex.

[73] Assignee: Shell Oil Company, Houston, Tex.

[21] Appl. No.: 285,219

[22] Filed: Jul. 17, 1981

Related U.S. Application Data

[63] Continuation of Ser. No. 943,012, Sep. 18, 1978, abandoned.

[51] Int. Cl.$^3$ .............................................. F16L 1/04
[52] U.S. Cl. ................................. 405/171; 405/158; 405/170; 106/266
[58] Field of Search ............... 405/158, 170, 166, 167, 405/171

[56] References Cited

U.S. PATENT DOCUMENTS

| 2,409,950 | 10/1946 | Meyer | 252/316 |
| 2,914,476 | 11/1959 | Alderman et al. | 252/316 |
| 4,252,465 | 2/1981 | Broussard et al. | 405/170 |

OTHER PUBLICATIONS

Chemical Abstracts, vol. 80:61205u.

*Primary Examiner*—Allan Lieberman

[57] ABSTRACT

A gel plug of vegetable oil, fatty acid, a particulate filler such as calcium carbonate, and an optional base and/or polymer is employed during construction of an offshore pipeline to separate a gas-filled portion of the pipeline from a water-flooded portion, and to facilitate control and movement of a gas/gel plug/water interface as desired to assist in construction operations.

6 Claims, No Drawings

PIPELINE GEL PLUG

This is a continuation, of application Ser. No. 943,012, filed Sept. 18, 1978 abandoned.

BACKGROUND OF THE INVENTION

Pipelines are long, hollow, flexible tubes of metal. When one end of a long pipeline lying horizontally on a flat surface is raised vertically, the pipe bends due to the weight of the unsupported segment. The maximum bending stress occurs in the bend near or at the horizontal surface. This bend is commonly referred to as the sagbend. As the end of the pipe is raised higher, the bending stress increases in the sagbend. Depending partially upon the pipe diameter, the wall thickness, the tensile strength of the metal and the external pressure on the pipe, the pipe will collapse when the compressive and tensile forces developed along the bend exceed the physical strength of the metal walls. The collapse may result in tearing and otherwise rupturing the pipe wall. When this occurs under water, as in a submarine pipe laying operation, it is known as a wet buckle. The free end of an anchored horizontal pipe can be raised higher before collapse occurs, if the pipe is stretched; e.g., kept under tension. Loss of the ability to keep the pipe under tension, due possibly to the failure of a barge anchor to hold, may result in a wet buckle of the pipe. The high velocity (up to 100 fps) water which enters through the rupture may fill a significant portion of the pipe before corrective action can be taken. Further, the water introduces undesirable and difficult to remove silt, sand and stones into the line. Before laying can be resumed, the pipe is commonly blown clear of water so that the ruptured end can be picked up. Wet buckles thus can result in substantial delays.

Lines can also be ruptured or punctured by foreign objects away from the sagbend. Anchors of ships are an example of such foreign objects. Water rushing in through the puncture will reach the sagbend and begin to fill the vertical portion of the pipe. The additional unsupported weight will in turn lead to a wet buckle at the sagbend.

One method of burying pipe lying at the bottom of water is to remove the soil beneath the pipe with high-velocity water jets which suspend the soil particles in a water-soil slurry so that the pipe sinks into the suspended soil. An air-filled pipe, because of its light weight in the water, will not readily sink into the suspension. While water filling the pipe prior to trenching can reduce the time, effort, and expense of burying the pipe, the water may also lead to wet buckles as above noted.

A weight coating such as concrete may be applied to large-diameter pipe to cause it to sink in water. The weight handling ability of the pipe laying equipment and economic reasons normally limit the quantity of coating close to the minimum necessary to cause the pipe to be negatively buoyant in water. The air-filled pipe lying on the bottom of the water body then is near the density of the water and thus easily moved about by flow currents which can shed vorticies behind the pipe. These vorticies, if at one of the natural frequencies of the pipe, may induce vibratory motion in the pipe with resulting stresses spalling the concrete off the pipe, creating a buoyant pipe. Thus, it is desirable to water-fill pipe, yet somehow avoid the above-noted problems with wet buckles.

Of pertinance to the present invention are U.S. Pat. Nos. 3,425,453; 3,842,613; 3,788,084; 3,472,035; 3,656,310; 3,777,499; 3,525,266; 3,751,932; 3,890,693.

The present invention not only provides a solution to the above problem, but also includes other improvements as more particularly described hereinafter.

SUMMARY OF THE INVENTION

A primary purpose of the present invention is to provide a movable gel plug of vegetable oil, fatty acid, a filler such as calcium carbonate, and an optional base and polymer, which will separate a water-filled segment of an offshore pipeline from an ambient air-filled segment, and thus allow water-fill weighting of a completed segment to a predetermined distance from an operating lay barge. Tall oil or soya oil are suitable vegetable oils. Stearic acid is a preferred fatty acid. Polybutene is a suitable polymer. The filler is a particulate such as coal dust, calcium carbonate, and gypsum.

DESCRIPTION OF PREFERRED EMBODIMENTS

The movable gel plug of the present invention is designed so that: (1) it can be pumped at low velocities in a large-diameter underwater pipe at a predetermined pressure, and upon cessation of pumping stops to withstand the hydrostatic force exerted by a relatively high column of water; (2) it can be pumped for many miles without losing this ability; (3) it is not contaminated by existing coatings on the pipe wall or by sea water and debris which may enter the pipe during construction; and (4) after stagnation time of up to one year or longer, it is movable by the previously predetermined pressure.

Such a movable gel plug, as above described, may be inserted into an underwater pipeline at the shore end and followed by pressurized water which pushes the plug into the desired position. This part of the pipeline then sinks due to increased weight. When the unfinished end of the pipeline is temporarily abandoned (due to weather conditions, et cetera), air is sealed into the unfinished but capped end. The shore end is further pressurized to reduce the volume of air, causing the pipeline to sink. To retrieve the unfinished end, the pressure is merely reduced.

The gel plug may also be used in a segment of pipe to temporarily prevent sea water from flooding the pipe when it is towed empty to the job site. Pipelines are sometimes constructed by joining long segments of pipe, made up on land, and then towed or dragged to the installation points for joining into the pipeline. In these operations, it is desirable to reduce the weight of the segments by the buoyancy of the air-filled pipe. Gel plugs are placed at each end of such segments to prevent water filling during pipe tow.

The primary constituents of the gel plug of this invention are vegetable oil, fatty acid, a filler, an optional base, and an optional polymer. Gel plug properties may be adjusted within limits, by the appropriate concentration and type of these constituents. The requirements of a movable gel plug for a submarine pipeline are unique and differ from requirements for such things as drilling fluids, mudpacks, product separators, and line scrapers which, in fact, are not comparable to the present invention. The movable gel plug is a Bingham plastic fluid having a high yield strength, high viscosity, and low gel strength. The yield strength is independent of shear stress, shear rate, total work input, and time. Plastic fluids were defined by Bingham as fluids having a yield strength that must be exceeded in order to initiate flow. More importantly for the movable gel plug, the flow stops when the force applied is less than the force required to overcome the yield strength. Bingham plastics exhibiting thixotropic properties (e.g., their flow properties may be time-dependent) are undesirable for use with the present invention. When a thixotropic fluid is allowed to stand quiescent, a gel structure is built up. When stress is applied, the gel structure breaks when the gel strength is exceeded. Movement further reduces the gel structure and decreases the flow resistance.

A thixotropic plastic, at low pressures, usually flows as a plug lubricated by a thin film of highly sheared liquid as the pipe wall when the applied force is greater than the resistance force due to the yield strength. Accordingly, non-thixotropic Bingham plastic is the best type of fluid for the movable gel plug. Inasmuch as the yield value of a plastic fluid can depend on friction between particles, specific surface area, and interparticle attractive forces, the gel plug of the present invention also contains a high concentration of small, solid particles.

The adhesive bond between the gel plug and pipewall must require more force to break than the force required to overcome the yield strength. Otherwise, the force required to move the plug would be equal to the force required to overcome the adhesive bond and not the yield strength. Also, the gel plug of this invention has the ability to adhere to the pipe wall if it is oil wet, water wet, or coated with paints or dirt. Because of this requirement, the gel plug employs polar, aromatic, acidic, unsaturated and adhesive polymer materials.

If, for example, the maximum pipeline depth below mean sea level is 530 feet, and the height of an onshore water injection pump is 50 feet above mean sea level, then the maximum hydrostatic head to which a gel plug therein, followed by water, can be exposed is 580 feet. Conservatively assuming that the line is filled with treated 3.5% saline sea water at 4° C., then the 580 feet head corresponds to a hydrostatic pressure of 259 psi. Such a plug must, at a minimum, be able to withstand this pressure without movement. Higher yield pressures (initiation of motion), however, are desirable in view of incursion of foreign water into the gel plug leading to decreased plug yield strength. For water-immiscible plugs, the foreign water is transported through the center of the plug and deposited at the front end. Continued plug movement pushes the water ahead without intermingling of the two phases. During the time that water is within the gel plug, the plug as a whole exhibits lower yield strength and viscosity. Sources for the incursion consist of water slippage past water/gel plug separators and line breaks in the leading part of the plug. The separators of the present invention do not pass water during normal operations but may do so when moving over obstacles left within the pipe. Accidental line breaks in the leading part of the plug, where internal pressure is less than local sea hydrostatic pressure, similarly allow water incursion. Line breaks at the trailing part of the plug will lead to gel discharge into the sea. In addition to the above accidental gel loss, there is some continuous loss past the separators as the plug moves down the line.

Considering the above parameters, it is preferred, as mentioned, that the gel materials behave as Bingham plastics or shear thinning Bingham plastics, and that the gel plug yield strength be over designed by in some cases a factor of about two. The yield pressure may then be twice the maximum hyrdostatic pressure. Another requirement for the plug is that it be able, at a minimum, to move at the maximum pipelaying rate, and to do so at acceptable pressures. For example, if the maximum design velocity is 0.2 fps or 3.27 miles per day, and the pressure limit is approximately 2200 psi, and design line discharge pressures range from 1100 to 1400 psi, then it is desirable that the plug move at 0.2 fps when subjected to about 1000 psi. Short plugs are undesirable because: (1) the consequent high yield gel is difficult to prepare and handle; (2) more rapid depletion of short plugs assuming quantity of gel material left behind by water/gel separators is independent of yield strength; and (3) reduction in yield and viscosity is more severe in short plugs for a fixed quantity of water incursion. Long plugs, on the other hand, also have drawbacks; for example: (1) the attendant low yield strength is more likely to allow water seepage past water/gel separators; (2) cost is approximately proportional to length; and (3) gel plug disposal problems are proportional to length. The present invention strikes a compromise between the above-listed criteria for determining length.

Velocity is approximately proportional to pressure drop and inversely proportional to plastic viscosity. The pressure drop to sustain a given velocity is controlled by the choice of viscosity. A high viscosity, resulting in a high pressure drop, yields a thick boundary layer along the pipe wall. The gel material beyond the boundary layer moves as a solid core. A thick secondary layer provides a good mixing and renewal of the gel layer immediately adjacent to the wall, faster than is the case with a thin boundary layer. Contamination of the wall layer by foreign substances (rust, debris, oil, water) and reduction in its effectiveness are also less severe with thick boundary layers. Water fingers along the plug and pipewall result in a thin annulus in the case of high yield but low viscosity materials. For high viscosity materials, the water is transported along the solid core resulting in a lower reduction in plug effectiveness. Further, high-viscosity plugs require very high pressures for rapid motion and such pressures may not be available. Also, high viscosity plugs have an inherent safety factor against equipment failure or unforeseen gel failure as they provide a longer reaction time for correction. In summary, high-viscosity gel materials are desirable in the present invention because of: (1) more rapid renewal of contaminated wall layers; (2) reduced likelihood of water fingering along the pipewall, resulting in total or partial plug failure; and (3) increased reaction time for correcting system failures or malfunctions.

Gel plug disposal methods depend on the plug constituents and environmental requirements. It is highly likely that plugs of low toxicity such as the present composition can be discharged into the sea. If the solid filler is calcium carbonate, resulting in a plug specific gravity of approximately 2.0, the plug will remain stable on the sea floor for eventual biological degradation. If disposal at sea is deemed unacceptable for any reason, then the plug material can either be barged to shore for eventual disposal or can possibly be cleaned and disposed as oil-base drilling muds are.

Considering the above requirements for the gel plug, it has been found that systems comprised of vegetable oil, fatty acid, particulate filler, and possibly a base and polymer are suitable for this application. Combinations of these compounds allow for the selection and control of desirable gel plug properties. For instance, yield strength is increased by addition of fatty acid plus base or fatty acid plus base plus filler. Plastic viscosity can be increased by addition of oil soluble polymers. The plug can be made water-immiscible or water non-wettable by addition of saturated animal fatty acids plus base. Steel wetability can be induced by selected oils and polymers. Vegetable oils suitable for use in the invention are soya oil, tall oil, sunflower oil, coconut oil, cottonseed oil, and corn oil. Preferred are soya oil and tall oil.

In further compliance with the above-described requirements, suitable fatty acids are distilled soya fatty acids, capric, lauric, myristic, palmitic, stearic acids, and mixtures thereof. Stearic acid is preferred.

To get more viscosity, a polymer such as a low molecular weight (MWX 1000) polybutene may be used.

Suitable optional bases for use with the invention include sodium hydroxide, potassium hydroxide and ammonia. Sodium hydroxide is preferred.

Also used with the fatty acid and the vegetable oil for reasons as above described is a filler such as calcium carbonate, coal dust, gypsum or the like.

Based on the complete mixed composition, the vegetable oil comprises from about 5 to about 30 weight percent, the fatty acid from about 1 to about 10 weight percent, and the filler from about 50 to about 80 weight percent; if used, the base comprises from about 0.01 to about 1 weight percent and the polymer comprises from about 1 to about 20 weight percent. Mixing of these ingredients preferably takes place according to the following procedure: Non-reacting liquid phases are blended at room temperature. These consist of vegetable oil and polymer. The mixture is heated to the melting point of the fatty acid (stearic acid MP=69.6° C.) and the fatty acid is added to it. The base is added to the filler in an approximately uniform fashion. The filler and base are then added to the blended vegetable oil, polymer, and fatty acid. The resulting mixture is stirred and then allowed to cure for approximately one day.

EXAMPLES

The following Table lists several compositions and properties at approximately 72° F.

| Composition | Gel Strength (dynes/CM$^2$) | Yield Strength (dynes/CM$^2$) | Viscosity (poise) | Steel Wetting | Water Displacement[1] |
|---|---|---|---|---|---|
| 11% Soya Oil 11% Polybutene 2% Soya Fatty Acid[2] 75% Calcium Carbonate .02% Sodium Hydroxide | 2000 | 2000 | 800 | Yes | Yes |
| 20% Polybutene 5% Soya Fatty Acid[2] 75% Calcium carbonate .05% Sodium hydroxide | 3000 | 3000 | 850 | Yes | Yes |
| 20% Soya oil 25% Stearic acid 79% Calcium carbonate 1% Sodium hydroxide | 10000 | 9500 | 1600 | Yes | Yes |

[1] Gel displaces water from water wet steel
[2] Contains soya oil plus various fatty acids including stearic acid

We claim as our invention:

1. A method for liquid fill weighting a completed segment of an offshore pipeline to within a predetermined distance from a vessel from which the pipeline is being laid comprising inserting a movable gel plug into the pipeline to separate an air-filled segment of the pipeline adjacent to the vessel from a liquid-filled segment of the pipeline, the gel plug comprising from about 5 to about 30 weight percent of a vegetable oil selected from the group consisting of soya oil, tall oil, sunflower oil, coconut oil, cottonseed oil and corn oil, from about 1 to about 10 weight percent of a fatty acid and from about 50 to about 80 weight percent of a particulate filler, and moving the gel plug as additional pipeline is laid to maintain the predetermined distance of the gel plug from the vessel.

2. The method of claim 1 wherein the gel plug includes from about 1 to about 20 weight percent of a polymer.

3. The method of claim 2 wherein the polymer is polybutene.

4. The method of claim 1 wherein the fatty acid is selected from the group consisting of distilled soya fatty acids, capric, lawric, myristic, palmitic, stearic acids and mixtures thereof.

5. The method of claim 1 wherein the gel plug includes from about 0.01 to about 1 weight percent of a base.

6. The method of claim 5 wherein the base is selected from the group consisting of sodium hydroxide, potassium hydroxide, and ammonia.

* * * * *